United States Patent [19]

Ulrich

[11] 3,859,418

[45] Jan. 7, 1975

[54] PROCESS FOR THE MANUFACTURE OF PHOSPHORUS NITRIDE DIAMIDES

[75] Inventor: Hannsjörg Ulrich, Ertstadt Kierdorf, Germany

[73] Assignee: Knapsack Aktiengesellschaft, Knapsack be; Koln, Germany

[22] Filed: Nov. 29, 1972

[21] Appl. No.: 310,593

[30] Foreign Application Priority Data
Dec. 1, 1971  Germany............................ 2159444

[52] U.S. Cl.................................. 423/302, 423/351
[51] Int. Cl. ...................... C01b 21/06, C01b 25/00
[58] Field of Search............................ 423/302, 351

[56] References Cited
UNITED STATES PATENTS
2,980,506  4/1961  Habornickel et al. ............... 423/302

FOREIGN PATENTS OR APPLICATIONS
1,918,697  11/1970  Germany ............................ 423/300
2,918,947  11/1970  Germany ............................ 423/300

Primary Examiner—Oscar R. Vertiz
Assistant Examiner—Gregory A. Heller
Attorney, Agent, or Firm—Connolly and Hutz

[57] ABSTRACT

Manufacture of phosphorus nitride diamides. To produce the compounds, white phosphorus or phosphorus trichloride in a polar, inert and alcohol-free solvent having a boiling point lower than 100° C is reacted with chlorine and an excess of gaseous ammonia. The resulting reaction product, which is a mixture of phosphorus nitride diamides and ammonium chloride, is filtered off and the phosphorus nitride diamides are isolated therefrom in conventional manner.

10 Claims, No Drawings

PROCESS FOR THE MANUFACTURE OF PHOSPHORUS NITRIDE DIAMIDES

The present invention relates to the manufacture of phosphorus nitride diamides.

It has already been reported that phosphorus nitride dichloride, which can be obtained (cf. German published Specifications DOS 1,918,697 and 1,918,947) from $PCl_5$ and ammonia, or from phosphorus, chlorine and ammonia, can be subjected under various conditions to further reaction with ammonia to give phosphorus nitride diamide $[PN(NH_2)_2]_n$. It has also been reported that phosphorus pentachloride can be reacted with an excess of ammonia in the presence of inert solvents to produce $[PN(NH_2)_2]_n$. These two processes result in the formation of mixtures of $[PN(NH_2)_2]_n$ and $NH_4Cl$.

These prior art processes use relatively costly starting materials and they commonly effect the incomplete substitution of $NH_2$-groups for the chlorine attached to the phosphorus, which is disadvantageous. It is therefore an object of the present invention to provide a process for the manufacture of phosphorus nitride diamide, wherein use is made of inexpensive starting materials, which should be elements as far as possible, and wherein a substantially completely amidated phosphazene is obtained in high yields in a substantially one-step smooth reaction.

We have now unexpectedly discovered that this is easy to achieve by the process of the present invention comprising reacting white phosphorus or phosphorus trichloride in a polar, inert and alcohol-free solvent having a boiling point lower than 100° C with chlorine and an excess of gaseous ammonia; filtering off the resulting reaction product, which is a mixture of phosphorus nitride diamides and ammonium chloride; and isolating the phosphorus nitride diamides therefrom in conventional manner.

In accordance with a preferred embodiment of the process of the present invention an excess of chlorine is introduced into a solution or suspension of phosphorus or phosphorus trichloride, the resulting reaction mixture is cooled down to temperatures between $-10°$ and $+20°$ C, gaseous ammonia is introduced into the cooled reaction mixture until the gases issuing therefrom give an alkaline reaction, and precipitated reaction product is filtered off. In those cases in which the starting material is white phosphorus, the introduction of gaseous ammonia thereinto should be started following the consumption of a three-fifths portion of the calculated quantity of chlorine, while cooling is continued. If the starting material is phosphorus trichloride, the calculated quantity of chlorine should preferably be introduced thereinto together with gaseous ammonia, while cooling is continued. Following complete introduction of gaseous ammonia, the reaction product should preferably be reflux-boiled for a period between 0.5 and 2 hours. This should more preferably be effected in the presence of a slight stream of gaseous ammonia.

The introduction of ammonia should preferably be effected at temperatures lower than $+10°$ C. The useful solvents include more particularly halogenated hydrocarbons, such as chloroform or methylene chloride. Following filtration of the reaction product, the solvents, which need not be purified, can be recycled and used again in the process.

We have also unexpectedly discovered that it is possible primarily by the selection of the solvent and secondly by the $NH_3$-addition to control the known reaction of $P_4$, $Cl_2$ and $NH_3$ in such a manner that either $(PNCl_2)_n$ or $[PN(NH_2)_2]_n$ is obtained. As already indicated above, it is necessary in selecting the solvent to consider its polarity and boiling point and naturally also its resistance to the action of chlorine. It is impossible, for example, to produce pure $[PN(NH_2)_2]_n$ in tetrachloroethane. Good results are, however, obtained in relatively rapid reactions if use is made of $CHCl_3$ and particularly of $CH_2Cl_2$.

Upon the start of the reaction, energy is found to be initially set free and the solvents used are automatically heated to boiling. With respect to the greater part of common high-boiling solvents, this may result — in the presence of an excess of $NH_3$ — in the formation of cross-linked phosphazenes of high molecular weight. The use of low-boiling solvents on the other hand has been found merely to effect the substitution of $NH_2$ on the P-N frame and hence to favor the formation of $[PN(NH_2)_2]_n$.

If use is made of the $CHCl_3$-solvent, side reactions which are caused by the alcohol contained therein for stabilization are likely to occur. As a result, alkyloxyphosphazenes of varying composition are partially obtained. This effect ceases to be produced if repeated use is made of $CHCl_3$.

Polar solvents, such as $CHCl_3$ and particularly $CH_2Cl_2$, have been found to favor the substitutive reaction of P—Cl to P—$NH_2$ and to effect the formation of $[PN(NH_2)_2]_n$ compounds which are easy to define analytically and at best have traces of covalent P—Cl-bonds therein. Despite the poorer solubility of phosphorus in $CH_2Cl_2$, which means longer reaction times, the $CHCl_3$-solvent should preferably be replaced by the $CH_2Cl$ as this solvent, which has a lower boiling point and is free from stabilizer (alcohol) enables pure $[PN(NH_2)_2]_n$ to be produced.

As taught in German published Specification DOS 1,918,697, it is possible in the manufacture of $(PNCL_2)_n$ from $PCL_5$ to avoid the formation of a $NH_4CL$ by-product by an appropriate selection of the $NH_3$-addition rate during the reaction. Use can, however, not be made of this in the production of $[PN(NH_2)_2]_n$ as it is necessary rapidly to capture the HCL set free, i.e., before it begins to combine additively with the reaction product, or before it undergoes further known reaction with the resultant formation of a phosphame $(PN_2H)_n$ final product having considerably less nitrogen therein, which is even more disadvantageous.

In the process of the present invention, it is therefore impossible to produce phosphorus nitride diamide free from $NH_4Cl$ without the use of an additional separating step. It is possible, however, by the selection of suitable steps to reduce the formation of the $NH_4Cl$ by-product down to a rate of less than 5 mols of $NH_4Cl$ per mol of phosphorus. One of these steps comprises, for example, commencing the introduction of $NH_3$ into the reaction solution only after consumption of substantially a three-fifths portion of the quantity of chlorine, which is theoretically needed.

The $NH_4Cl$-impurities can be separated in conventional manner by means of liquid $NH_3$ or diethylamine in $CHCl_3$.

The resulting mixture of $[PN(NH_2)_2]_n$ and $NH_4Cl$, which is isolated by filtration, can be dried directly or following separation of $NH_4Cl$, at 40°–60° C under vacuum.

As compared with the prior art, the process of the present invention offers beneficial effects which reside in the use of inexpensive starting materials and in the fact that the complete reaction to the $[PN(NH_2)_2]_n$-stage is carried out in a single reactor and this with the possibility of reusing the solvent, which need not be purified, the yields being substantially quantitative, based on $P_4$.

The following Examples illustrate the process of the present invention without limiting it thereto.

EXAMPLE 1

1,050 grams (7.65 mols) of $PCl_3$ in 7 liters of $CHCl_3$ were reacted with $Cl_2$-gas. The reaction occurred with spontaneous heating until complete. This was indicated by escaping chlorine in excess. The solution so obtained was cooled in an ice bath and $NH_3$-gas was introduced thereinto until the issuing gases showed a distinct alkaline reaction. The precipitate was filtered off and dried at 50° C under vacuum. The yield was 2,261 grams or 87% of the theoretical, based on phosphorus trichloride. The mixture consisted of 24.5% of $[PN(CH_2)_2]_n$; the balance was $NH_4Cl$.

EXAMPLE 2

31 grams (1 mol) of white phosphorus were dissolved or suspended in 3 liters of $CHCl_3$ and $Cl_2$ was introduced into the solution or suspension until the reaction, which occurred with spontaneous heating was complete. The resulting yellowish solution was cooled down to 0° C and $NH_3$ was introduced thereinto at the rate necessary to maintain the solution at a temperature not exceeding 10° C. Once the issuing gas gave a distinct alkaline reaction, the reaction was stopped and the resulting white product, which was readily soluble in cold water, was filtered off and dried under vacuum. The yield was 315 grams or 91.5% of the theoretical. The ratio of P:N:Cl was found to be 1:7.9:5.

EXAMPLE 3

The procedure was the same as that described in Example 2 save that the reaction mixture was refluxboiled for substantially 1 hour in the presence of a slight stream of $NH_3$, as soon as the issuing gas gave an alkaline reaction. Following isolation and drying, the final product was obtained in a yield of 337 grams or 98% of the theoretical.

EXAMPLE 4

31 grams (1 mol) of white phosphorus were suspended in 1 liter of $CH_2Cl_2$ and subjected to chlorination which occurred with spontaneous heating. Chlorination was continued and the introduction of $NH_3$ was started after consumption of substantially a three-fifths portion of the calculated quantity of chlorine, and the solution was cooled from the outside. The introduction of chlorine was stopped as soon as the space above the liquid, occupied by gas, commenced assuming a green coloration. Following the identification of an excess of ammonia, the reaction was stopped, the reaction product was isolated and dried. The yield was 257 grams or 88.5%. The product was analyzed and found to contain P, N and Cl in the atomic ratio of 1:7:4. This corresponded to the composition of $[PN(NH_2)_2]_n \cdot 4n\ NH_4Cl$

I claim:

1. A process for the manufacture of phosphorus nitride diamides, which comprises reacting a starting material, which is white phosphorus or phosphorus trichloride being dissolved or suspended, in a polar, inert and alcohol-free organic solvent having a boiling point lower than 100° C with chlorine and an excess of gaseous ammonia; filtering of the resulting reaction product consisting of a mixture of phosphorus nitride diamides and ammonium chloride; and separating the phosphorus nitride diamides therefrom.

2. The process as claimed in claim 1, wherein an excess of chlorine is introduced into the said solution or suspension of phosphorus or phosphorus trichloride, the resulting mixture is cooled down to temperatures between −10° and +20° C, gaseous ammonia is introduced into the cooled reaction mixture until the gases issuing therefrom show an alkaline reaction, and precipitated reaction product is filtered off.

3. The process as claimed in claim 1, wherein the starting material is white phosphorus and wherein the introduction of gaseous ammonia is started following the consumption of a three-fifths portion of the stoichiometric quantity of chlorine, while cooling.

4. The process as claimed in claim 1, wherein the starting material is phosphorus trichloride and wherein the stoichiometric quantity of chlorine is introduced thereinto together with gaseous ammonia, while cooling.

5. The process as claimed in claim 1, wherein, following complete introduction of gaseous ammonia, the reaction product is reflux-boiled for a period between 0.5 and 2 hours.

6. The process as claimed in claim 5, wherein the reaction product is reflux-boiled in the presence of a slight stream of gaseous ammonia.

7. The process as claimed in claim 1, wherein the ammonia is introduced at temperatures lower than 10° C.

8. The process as claimed in claim 1, wherein the solvent is a halogenated hydrocarbon.

9. The process as claimed in claim 8, wherein the solvent is chloroform or methylene chloride.

10. The process as claimed in claim 1, wherein, following filtration of the reaction product, the solvent is recycled and used again, without subjecting it to any purifying treatment.

* * * * *

UNITED STATES PATENT AND TRADEMARK OFFICE
CERTIFICATE OF CORRECTION

PATENT NO. : 3,859,418
DATED : January 7, 1975
INVENTOR(S) : Hannsjorg Ulrich

It is certified that error appears in the above-identified patent and that said Letters Patent are hereby corrected as shown below:

Change the Assignee's name from "Knapsack Aktiengesellschaft Knapsack be; Koln, Germany"

to -- Hoechst Aktiengesellschaft
Frankfurt am Main, Germany --

Signed and Sealed this seventh Day of October 1975

[SEAL]

Attest:

RUTH C. MASON
*Attesting Officer*

C. MARSHALL DANN
*Commissioner of Patents and Trademarks*